April 29, 1969

E. SAUER 3,440,942

MIRROR REFLEX CAMERA

Filed Aug. 24, 1966

United States Patent Office 3,440,942
Patented Apr. 29, 1969

3,440,942
MIRROR REFLEX CAMERA
Edgar Sauer, Stuttgart-Rohr, Germany, assignor to Zeiss Ikon Aktiengesellschaft, Stuttgart, Germany, a corporation of Germany
Filed Aug. 24, 1966, Ser. No. 574,641
Claims priority, application Germany, Sept. 1, 1965, Z 11,733
Int. Cl. G03b 19/12
U.S. Cl. 95—42          1 Claim

ABSTRACT OF THE DISCLOSURE

A mirror reflex camera is provided for use with conventional film cartridges which latter have two horizontally spaced film spool chambers connected with each other by a bridge over which the film is moved from one chamber to the other. In order to be able to employ such a cartridge, the latter has to be inserted into the corresponding spool chamber receiving recesses of the camera casing in an inverted manner, because the scanning members for advancing the film and for introducing the film speed into the camera are arranged in the lower portion of the camera casing, the upper portion of which contains the reflex finder.

---

Figure 1:
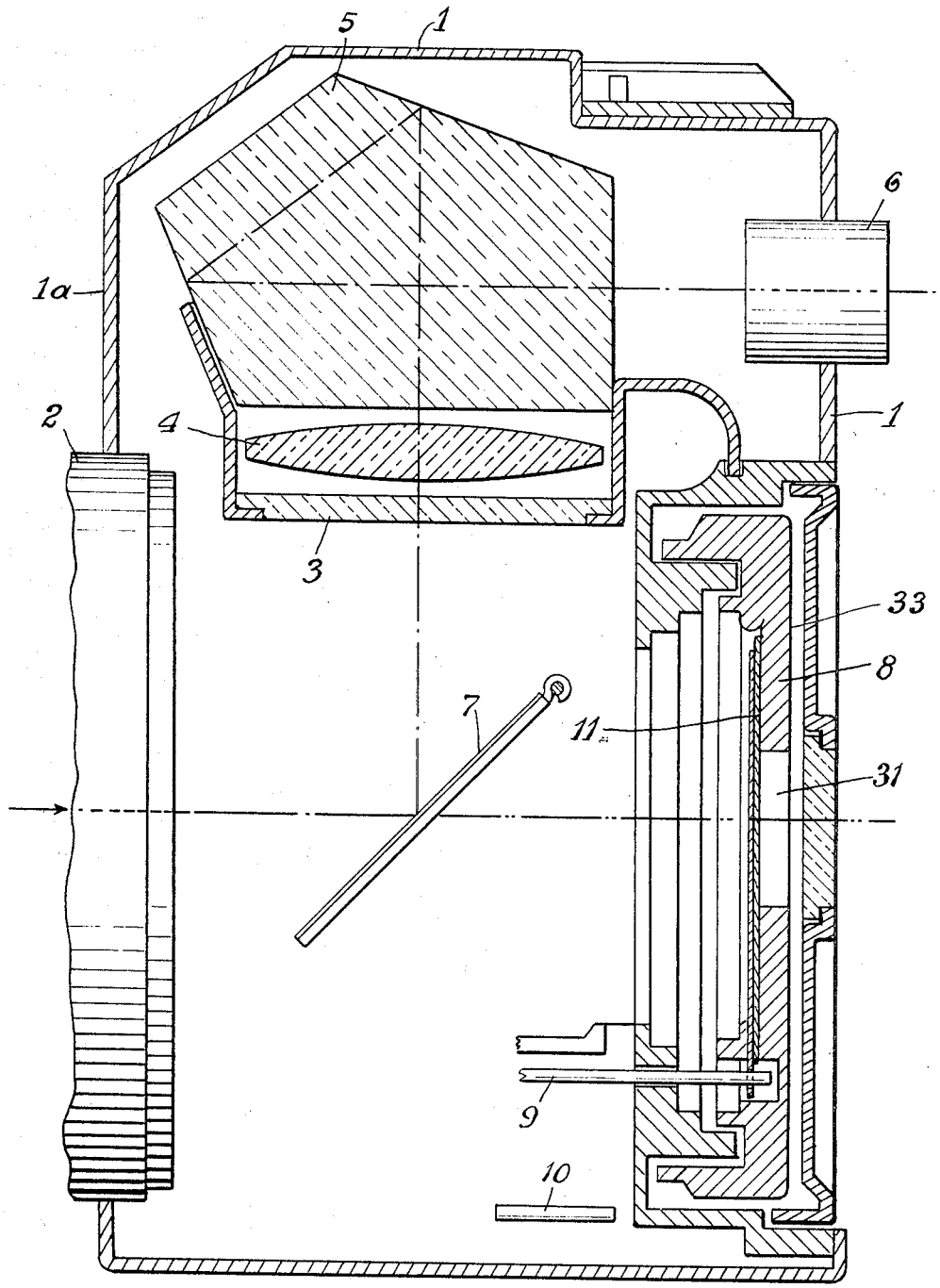

The invention relates to a mirror reflex camera. It is an object of the invention to construct such a camera in such a manner that it may be used with film cartridges which are provided on both ends with film spool chambers which project forwardly from a bridge containing a picture window and into matching recesses in the camera body.

In film cartridges of this type the film travels from one chamber over the bridge in which the picture window is arranged and into the other. Film cartridges of this type are provided adjacent the upper wall with control means which cooperate with scanning mechanisms arranged in the upper portion of the camera. One of these scanning mechanisms is employed for scanning the film which moves along the bridge and operates to prevent a double exposure of the individual film frames, while another scanning device cooperates with markings on the outside of the cartridge, whereby the positions or shape of these markings constitutes an indication of the speed of the film in the cartridge and transfers this indication into the exposure control mechanism of the camera.

In mirror reflex cameras the use of such film cartridges is not possible without overcoming some difficulties. The principal difficulty resides in this, that there is not sufficient space for the two mentioned scanning mechanisms in the upper part of the casing of a conventional mirror reflex camera, because of the particular construction and arrangement of the viewfinder comprising a field lens, a focusing disc, the roof top prism and an ocular.

It is an object of the invention to overcome this difficulty by arranging the above mentioned scanning mechanisms in the lower part of the camera casing. When this is done the film cartridge compared with its conventional position has to be rotated about 180°; namely, it has to be inserted upside down into the camera casing in order to properly cooperate with the scanning mechanisms arranged therein.

Another object of the invention is a mirror reflex camera in which the insertion of the mentioned film cartridge cannot take place in an incorrect manner. This object is obtained in simple manner by providing the camera body of the mirror reflex camera with recesses for the reception of the film spool chambers which are of different sizes. It is known from conventional cameras that the film wind-up spool, which is operated by a film-advancing knob or lever, is inserted in a film spool chamber which has a greater diameter than the other film spool chamber in which a spool with unexposed film is arranged. Therefore, in accordance with the invention, the body of the camera is provided with recesses for film spool chambers having a different diameter from one another, so that the film cartridge can only be inserted into the camera in an upside-down position.

These and other features of the invention will now be described with reference to the accompanying drawings which illustrate by way of example one specific embodiment of the invention.

Figure 2:
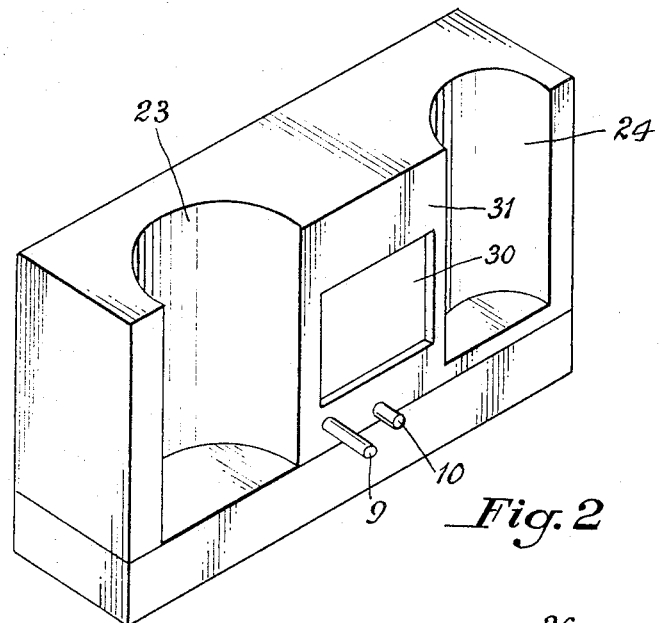
Figure 3:
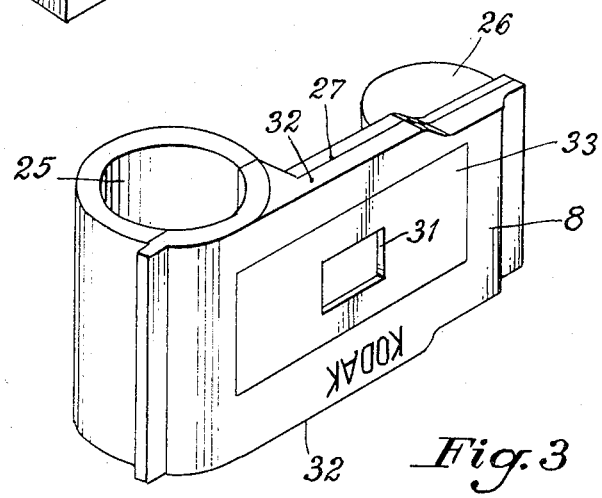

In the drawings:

FIG. 1 illustrates a centrally arranged vertical sectional view of the mirror reflex camera, FIG. 2 illustrates diagrammatically a perspective rear view of the camera body without the camera objective and wihtout the viewfinder system, and FIG. 3 illustrates diagrammatically a rear view of the film cartridge in its inverted position in which it is inserted in the camera.

Referring to FIG. 1, the camera casing 1 is provided on its vertical front wall 1a with a mount 2 for receiving the camera objective and also a central shutter. The top part of the camera casing 1 has mounted therein a viewfinder device comprised essentially of a focusing disc 3, a picture field lens 4, a roof top prism 5, and an ocular 6, which latter is illustrated only diagrammatically. Within the camera is also arranged a pivotally mounted reflecting mirror 7 and the film cartridge 8, a perspective view of which is illustrated in FIG. 3. This film cartridge 8 is inserted from the rear of the camera and as already indicated in the foregoing, it has to be inserted in an upside-down position. The picture plane within the film cartridge 8 is indicated by 11 in FIG. 1 and along this plane is moved the film from one film spool chamber into the other film spool chamber in a horizontal direction. Within the lower part of the camera are also arranged two scanning members 9 and 10, in vertically spaced arrangement. The scanning member 9 forms a part of the film advancing control mechanism and is adapted to enter a perforation in the film so as to prevent a double exposure of the film. The other scanning member 10 engages a recess or other mark on the front wall of the film cartridge, whereby either the location or the shape of the mark constitutes an indication of the speed of the film in the cartridge.

The described position of these scanning members 9 and 10 in the lower portion of the camera casing makes it obvious that the film cartridge has to be rotated about 180°; namely, it has to be inserted upside down into the camera casing. In this manner the space in the upper part of the camera casing remains unrestricted for arranging therein the viewfinder device and no increase in the dimensions of the camera casing is necessary.

FIG. 3 is a perspective view of the film cartridge, such as a Kodapak, which may be used with a mirror reflex camera of the present invention. The cartridge 8 is inserted in the illustrated upside-down position in the camera. The left hand film spool chamber 25 is larger than the right hand film spool chamber 26 and receives the exposed film and is adapted to be received by the larger recess 23 of the camera body as shown in FIG. 2. The right hand film spool chamber 26, which contains a spool with unexposed film, is smaller in height than the chamber 25 and also has a smaller diameter than the latter. This smaller film spool chamber 26 is received by a correspondingly dimensioned recess 24 (FIG. 2) in the camera body. The different sizes of the film chambers 25 and 26 prevent a wrong insertion of the cartridge in the camera. The two film spool chambers 25 and 26 are connected with each other by a straight bridge portion 32 and the center line, which indicates the picture plane, is indicated by the line 27. The film moves horizontally from the chamber 26 into the chamber 25. The rear wall 33 of the cartridge 8 is provided with a window 31 in which appear the picture numbers which are arranged on a light-proof backing strip to which the film is attached. In FIG. 2 are indicated the two scanning members 9 and 10 which engage the film and the body of the film cartridge 8 when the latter is inserted in the camera casing.

What I claim is:

1. The combination comprising a mirror reflex camera having a casing provided with two horizontally spaced vertical film spool receiving recesses of unequal size, a film advancing means, and a film cartridge having means forming two horizontally spaced film spool chambers of unequal size and extending from the rear of said casing into said recesses, said film cartridge being provided with a bridge connecting said two film spool chamber forming means with each other, said film advancing means being provided for moving a film in said cartridge from one of said chambers into the other, a first scanning member associated with said film advancing means and a second scanning member for the film speed, both said scanning members being arranged in the lower part of said casing, one of said scanning members being provided for engaging and advancing the film in said cartridge, and the other scanning member being provided for engaging a film speed indicating mark on said cartridge, said recesses of unequal size being arranged in such a manner that said film cartridge can only be inserted in an inverted position into said casing for cooperation with said scanning members.

References Cited

UNITED STATES PATENTS

| | | | |
|---|---|---|---|
| 3,138,084 | 6/1964 | Harvey | 95—31 |
| 3,260,182 | 7/1966 | Nerwin | 95—31 |
| 3,312,158 | 4/1967 | MacMillin et al. | 95—10 |
| 3,347,142 | 10/1967 | Steisslinger | 95—31 |

NORTON ANSHER, *Primary Examiner.*

CHARLES B. FUNK, *Assistant Examiner.*